Patented Dec. 18, 1923.

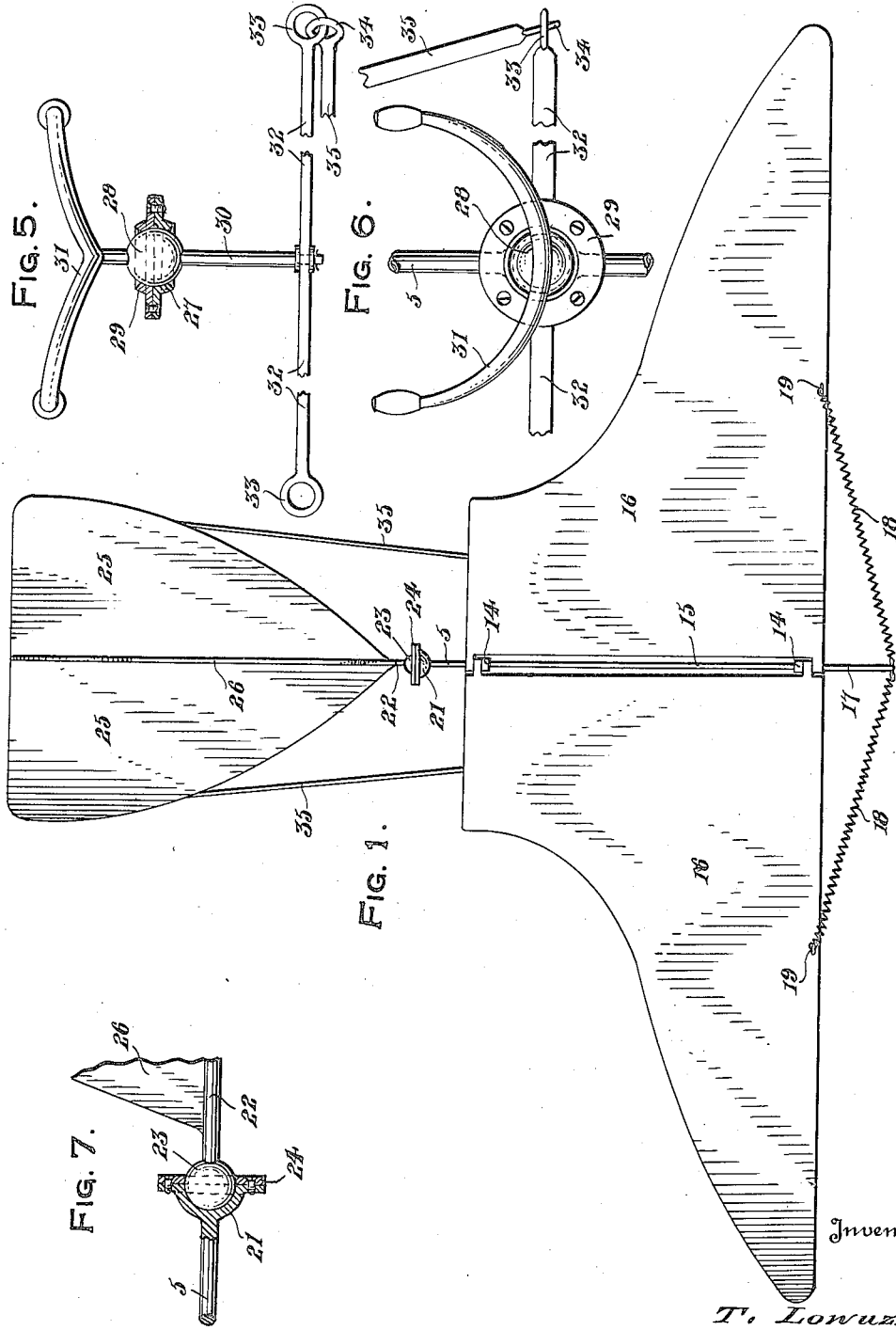

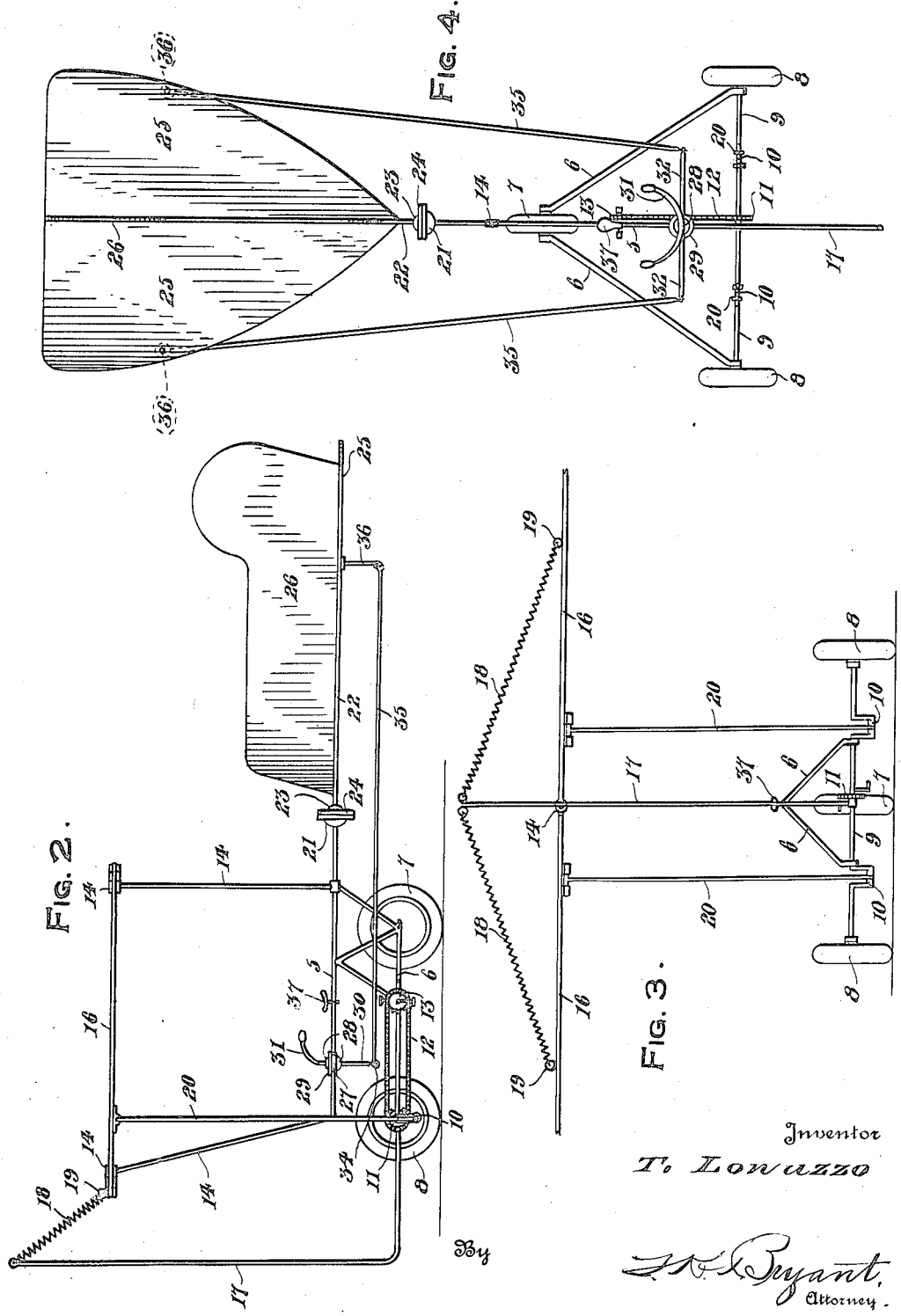

1,478,284

UNITED STATES PATENT OFFICE.

TOMMASO LONUZZO, OF BRISTOL, CONNECTICUT.

AEROPLANE.

Application filed April 24, 1923. Serial No. 634,256.

*To all whom it may concern:*

Be it known that I, TOMMASO LONUZZO, a subject of the King of Italy, residing at Bristol, in the county of Hartford and State of Connecticut, have invented certain new and useful Improvements in Aeroplanes, of which the following is a specification.

This invention relates to new and useful improvements in aeroplanes of the glider type.

An important object of the invention is to provide a novel combination of propulsion means for travel along the ground and elevating means for inducing flight.

A further object of the invention is to provide an improved steering mechanism that is of exceedingly simple construction capable of providing a universal control of the steering rudders.

Other objects and advantages of the invention will be apparent during the course of the following description.

In the accompanying drawings forming a part of this specification and in which like numerals are employed to designate like parts throughout the same, Figure 1 is a top plan view of the aeroplane embodying this invention, Figure 2 is a side elevational view of the device shown in Fig. 1, Figure 3 is a front elevational view of the device showing means for actuating the wings, Figure 4 is a plan view of the device with the wings removed for better displaying the working parts, Figure 5 is a detail view, partly in section of the controlling means for steering the device, Figure 6 is a fragmentary plan view of the steering mechanism shown in Fig. 5, and Figure 7 is a fragmentary detail view showing a universal connection in the steering rod controlling the steering rudders.

In the drawings, wherein for the purpose of illustration is shown a preferred embodiment of this invention, the numeral 5 designates a horizontal bar constituting the main portion of the body frame and from which depends a skeleton frame work 6 that provides a support for the single rear ground engaging wheel 7 and spaced front wheels 8, the said front wheels being operatively connected with a horizontal axle 9 that is provided with crank portions 10 and a sprocket wheel 11, the said sprocket wheel being engaged by a sprocket chain 12 that is operatively connected with a second sprocket wheel 13 supported by the skeleton frame 6 and provided with suitable foot propulsion means for driving the said horizontal shaft 9 whereby the said front wheels 8 will be rotated for driving the machine over the ground.

Extending perpendicularly from the horizontal frame bar 5 are a pair of spaced strut members 14 that are provided for supporting a horizontal shaft 15 to which the laterally extending wings 16 are pivotally connected. There is further provided an angle bar 17 that is rigidly connected to the skeleton frame work 6 and extends perpendicularly in front of the machine to a point elevated from the planes 16 for the purpose of attaching tension springs 18 to its upper end, the said tension springs being connected to the wings 16 at points 19 spaced from the horizontal pivot rod 15. The wings 16 are further provided with actuating rods 20 that depend to be connected at their lower ends with the crank portions 10 formed in the horizontal driving shaft 9.

The rear end of the horizontal frame bar 5 is provided with a socket member 21 that is adapted for supporting the rudder carrying bar 22 which is provided with a ball member 23 secured to its inner end and suitably clamped in position within the socket member 21 by a clamping plate 24. Rigidly connected to the rudder carrying bar 22 are a pair of laterally extending blades 25 that are provided for controlling the vertical movement of the device, there being further provided a perpendicular steering blade 26 that is rigidly connected to the rod 22 for the purpose of controlling lateral movement of the device in either direction. Formed integrally with the horizontal frame bar 5 and positioned in proximity to its forward end is a socket member 27 that is adapted for supporting a ball 28 which is suitably retained in the said socket by means of a clamping socket plate 29. Rigidly carried by the ball 28 is a perpendicular bar 30 that is provided at its upper end with a pair of handle bars 31 while the lower end is rigidly connected to a cross link 32 having eye portions 33 formed in its outer ends. Loosely connected to the eye portions 33 by similar eyes 34 are rearwardly extending rods 35 that are connected at their outer ends with depending arms 36 carried by the laterally extending steering blades 25. It will be understood that the universal ball and socket connection between the rudder carrying rod 22 and the frame bar 5 will allow free movement of the steering blades 25 and 26 for properly controlling the movement of the device in any direction while in flight and laterally in either direction while travelling upon the ground, and due to the universal support of the steering post 30 and its connection rods 35 the handle bars 31 may be actuated for causing the desired movement of the steering blades 25 and 26. A suitable seat 37 is carried by the horizontal frame bar 5 in a proper position for allowing the operator of the device to actuate the sprocket wheel 13 by means of its actuating elements for driving the front wheels 8 and reciprocating the wings 16 while the steering bars 31 may be conveniently reached for actuating the rudder blades 25 and 26.

The operation of the device is as follows:—

With the operator properly positioned upon the seat 37 with his hands controlling the steering bar 31 and his feet actuating the sprocket wheel 13, the device may be driven over the ground at any desired speed while the planes 16 will be flapped at the same time for the purpose of causing the machine to rise from the ground, the tension springs 18 being employed for returning the planes 16 to their normal position after being moved in a downward direction by the crank portions 10 formed in the drive shaft 9. After rising into the air, the planes 16 may be retained stationary in a horizontal position for the purpose of enabling the machine to glide.

It is to be understood that the form of this invention herewith shown and described is to be taken as the preferred example of the same, and that various changes in the shape, size, and arrangement of parts may be resorted to without departing from the spirit of the invention or the scope of the subjoined claim.

Having thus described the invention, I claim:—

In a device of the class described, a frame bar, ground engaging wheels associated therewith, planes pivotally associated with said bar, means for actuating said planes and wheels in unison, steering blades universally connected to said bar, a steering post universally connected to said bar, and means connecting said post with said steering blades.

In testimony whereof I affix my signature.

TOMMASO LONUZZO.